United States Patent
Kondo et al.

(10) Patent No.: US 6,697,560 B1
(45) Date of Patent: Feb. 24, 2004

(54) STRUCTURE FOR HOLDING OPTICAL FIBER

(75) Inventors: Katsuaki Kondo, Hyogo (JP); Kazuo Imamura, Hyogo (JP); Minoru Yoshida, Hyogo (JP)

(73) Assignee: Mitsubishi Cable Industries, LTD (JP)

( * ) Notice: Subject to any disclaimer, the term of this patent is extended or adjusted under 35 U.S.C. 154(b) by 80 days.

(21) Appl. No.: 10/048,834

(22) PCT Filed: Aug. 3, 2000

(86) PCT No.: PCT/JP00/05232

§ 371 (c)(1),
(2), (4) Date: Feb. 6, 2002

(87) PCT Pub. No.: WO01/11400

PCT Pub. Date: Feb. 15, 2001

(30) Foreign Application Priority Data

Aug. 6, 1999 (JP) .......................................... P11-223363

(51) Int. Cl.⁷ ................................................. G02B 6/00
(52) U.S. Cl. ...................................................... 385/137
(58) Field of Search ........................................ 385/137

(56) References Cited

U.S. PATENT DOCUMENTS 4,730,893 A  *  3/1988  Burmeister ................. 385/137
5,323,481 A  *  6/1994  Tokumaru et al. .......... 385/136

FOREIGN PATENT DOCUMENTS

| JP | 58-207006 A | 12/1983 |
| JP | 8-86920 A | 4/1996 |
| JP | 2888157 B2 | 2/1999 |
| JP | 11-202149 A | 7/1999 |

* cited by examiner

*Primary Examiner*—Javaid H. Nasri
(74) *Attorney, Agent, or Firm*—Birch, Stewart, Kolasch & Birch, LLP

(57) ABSTRACT

A thin member for sealing and holding optical fibers laid two-dimensionally is composed of a base member layer, an adhesive member layer deposited on the base member layer, and a laminate member layer holding the optical fibers between it and the adhesive member layer. The optical fibers are arranged parallel not to be superposed on one another. They are bent individually by 180 degrees at the right-hand end of the thin member, bent downward toward the lower side of the thin member at the area from the central part to the left-hand side part, and led out of the thin member. Hence the structure is thin and therefore can be accommodated in a small space, enabling a small size. If the portions, led out of the thin member, of the optical fibers are covered with tubes, breakage of the optical fibers can be prevented. The thin member can be flexible.

9 Claims, 7 Drawing Sheets

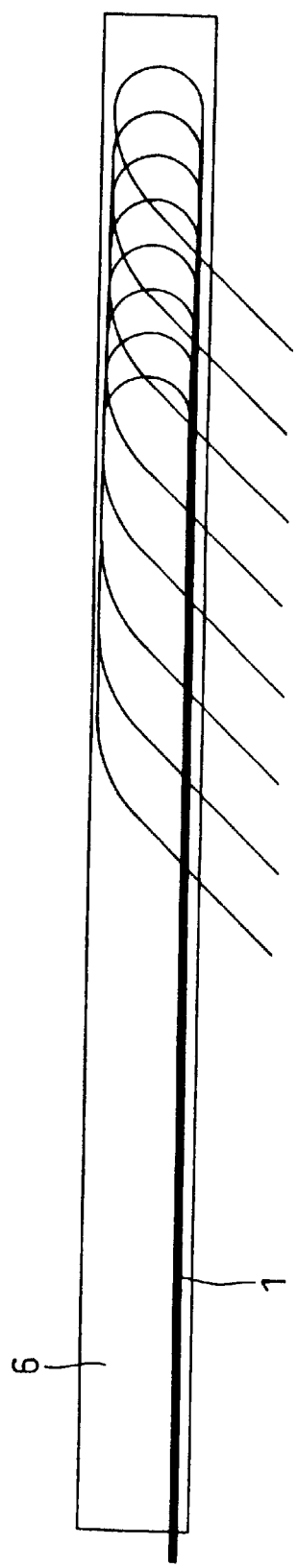
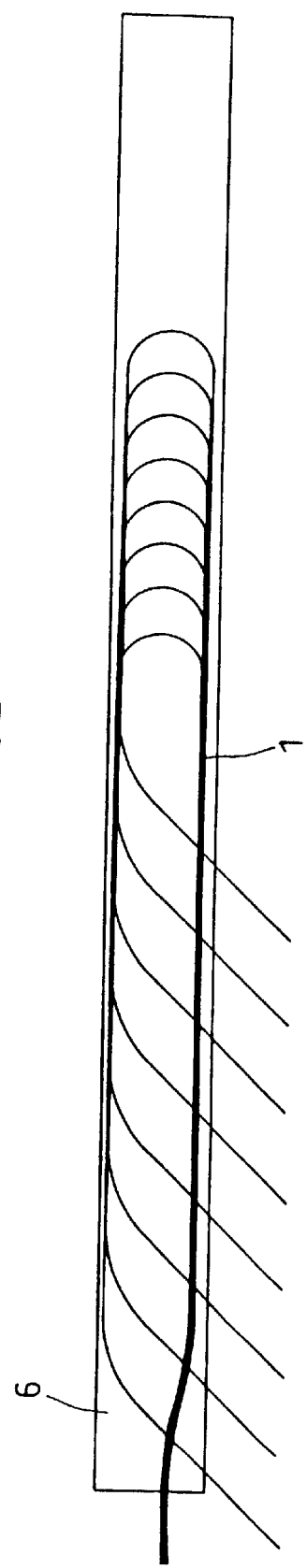
FIG. 3A
FIG. 3B

STRUCTURE FOR HOLDING OPTICAL FIBER

This application is the national phase under 35 U.S.C. §371 of PCT International Application No. PCT/JP00/05232 which has an International filing date of Aug. 3, 2000, which designated the United States of America.

TECHNICAL FIELD

The present invention relates to a structure for integrally holding a plurality of optical fibers.

BACKGROUND ART

Generally, in various devices and modules for optical communication, there is such a case that a plurality of long optical fibers have to be collectively housed in a device.

In order to hold such a plurality of optical fibers in one bundle, conventionally, a process of taking up each of the optical fibers by a reel or routing the optical fibers in a casing is performed.

To hold a plurality of optical fibers in one bundle, there is another case that an optical fiber ribbon is used. The optical fiber ribbon is obtained by arranging a plurality of optical fibers in parallel, covering the optical fibers with a resin, and forming the optical fibers in a rectangular ribbon shape in cross section. This optical fiber ribbon is characterized in that, due to its rectangular shape in cross section, it cannot be bent in the lateral direction (direction in which the optical fibers are arranged in parallel). Conventionally, therefore, by separating the optical fiber ribbon into single optical fibers and routing the optical fibers, housing of the optical fibers is facilitated.

The conventional structure for holding optical fibers housed in such a manner has, however, the problems as follows.

In the case of using a reel, to prevent occurrence of a loss caused by the housing, it is necessary to take up the optical fibers orderly around the reel. Consequently, it takes time and effort to take up the optical fibers.

In the case of routing the optical fibers in a device, a work has to be done while being paid attention so as not to cause entanglement or breaking of the optical fibers, so that it takes time and effort for housing.

In the case of using an optical fiber ribbon, since it cannot be bent in the lateral direction, it is necessary to separate the optical fiber ribbon into single optical fibers and route each of the optical fibers. Like the case of simply routing the optical fibers mentioned above, it takes time and effort for taking up and housing the optical fibers.

Moreover, in any of the cases, the optical fibers cannot be dealt in a plane, a large housing space is required, and it causes such a problem that the size cannot be sufficiently reduced.

Therefore, an object of the present invention is to facilitate a work of housing a plurality of long optical fibers into a device, reduce a housing space, and accordingly realize a reduced size by enabling the optical fibers to be handled integrally.

DISCLOSURE OF INVENTION

According to the present invention, an optical fiber is routed in a plane and sealed with a thin member. With the configuration, optical fibers can be integrally handled without coming apart or getting entangled as a whole and easily disposed in a device. Since the optical fibers are sealed with the thin member, a sheet state is obtained as a whole. Consequently, a small housing space is sufficient and a small size can be achieved. Moreover, the optical fibers are protected by the thin member, an influence such as a damage can be lessened.

The invention can be easily realized by sandwiching the optical fiber by the thin member.

The invention becomes more effective in the case of holding a plurality of optical fibers.

According to the invention, in the improved structure for holding an optical fiber mentioned above, lengths of the plurality of optical fibers are set to required lengths. Consequently, a transfer time difference can be set between optical fibers.

According to the invention, in the improved structure for holding an optical fiber mentioned above, lengths of the plurality of optical fibers are set to the same length. Consequently, the transfer time of the optical fibers becomes the same, and it becomes unnecessary to consider a delay difference among the optical fibers.

According to the invention, in the improved structure for holding an optical fiber mentioned above, an optical fiber in the thin member is provided with a redundancy area for adjusting the length of the optical fiber. Thus, the transfer time difference among the optical fibers can be easily adjusted.

According to the invention, in the improved structure for holding an optical fiber mentioned above, an end part of the optical fiber led from the thin member is covered with a protection tube and this protection tube is held by the thin member. Since the portion of the optical fiber led out from the end of the thin member can be reinforced and protected by the protection tube, breakage of the optical fiber in this portion can be prevented.

In the structure for holding an optical fiber according to the invention, the thin member can be made of, for example, a material whose main component is a resin. Further, the thin member can be made of a material whose flexibility can be controlled. With such a configuration, according to the degree of mounting to a device, the mounting can be facilitated by arbitrarily controlling the flexibility of the thin member.

According to the invention, in the improved structure for holding an optical fiber mentioned above, a connector is attached to an end of an optical fiber led from the thin member to the outside. It makes the connection to another device easy.

According to the invention, in the improved structure for holding an optical fiber above mentioned, an air layer is provided in a portion where the optical fibers cross each other in the thin member. Consequently, when the thin member is bent, the air layer functions as a buffer material so that an excessive bending force can be prevented from being applied to the optical fibers which cross each other.

BRIEF DESCRIPTION OF DRAWINGS

FIG. 2A is a cross section taken along line A—A of FIG. 1, and FIG. 2B is a cross section taken along line B—B of FIG.1.

FIGS. 3A and 3B are a plan view used to describe a case where optical fibers are stacked in two layers in the structure for holding optical fibers.

BEST MODE FOR CARRYING OUT THE INVENTION

A best embodiment of the present invention will be described in detail hereinbelow with reference to FIG. 1.

Figure 1:
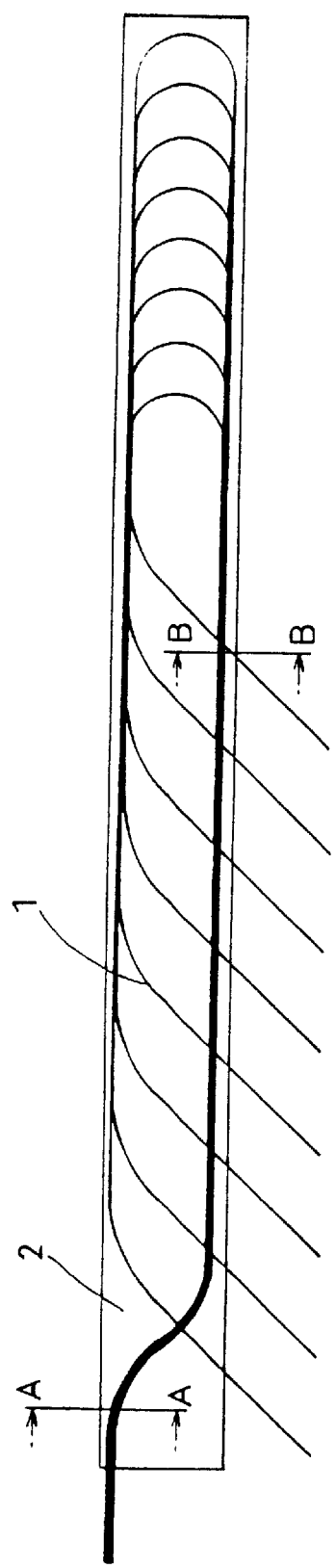
FIG. 1 is a plan view showing a structure for holding optical fibers according to an embodiment of the present invention.
Figure 2A:
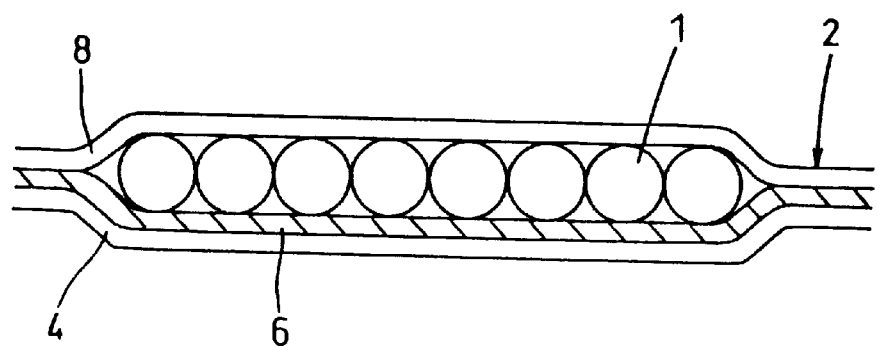
FIGS. 2A and 2B are cross sections of required part in FIG. 1.

FIG. 1 is a plan view showing a structure for holding optical fibers in the embodiment of the invention. FIG. 2A is a cross section taken along line A—A of FIG. 1, and FIG. 2B is a cross section taken along line B—B of FIG. 1.

In this structure for holding optical fibers, a plurality of (eight in this example) of long optical fibers 1 are routed in a plane and integrally sealed and held by a thin member 2. The sealing herein is not limited to a sealed state where the inside of the thin member 2 is not communicated with the outside air but is a concept also including a state where the inside is communicated with the outside air.

Each of the optical fibers 1 is arranged in parallel so as not to be overlapped with each other at the left end of the thin member 2 having a rectangular shape in plan view in the direction parallel to the plane direction of the thin member 2. The optical fibers 1 are introduced into the thin member 2 in this state. In the right part of the thin member 2, each of the optical fibers 1 is bent backward, thereby changing the direction of the optical fibers 1 to the opposite direction. At this time, by making the bending positions of the optical fibers 1 deviate from each other in the plane direction of the thin member 2, the bending positions are set so as not to be overlapped with each other. Further, the optical fibers 1 are bent downward of the thin member 2 in the positions from the center to the left end of the thin member 2 and led out of the thin member 2. By making the leading positions of the optical fibers 1 deviate from each other in the plane direction of the thin member 2, the leading positions are set so as not to be overlapped with each other.

Figure 2B:
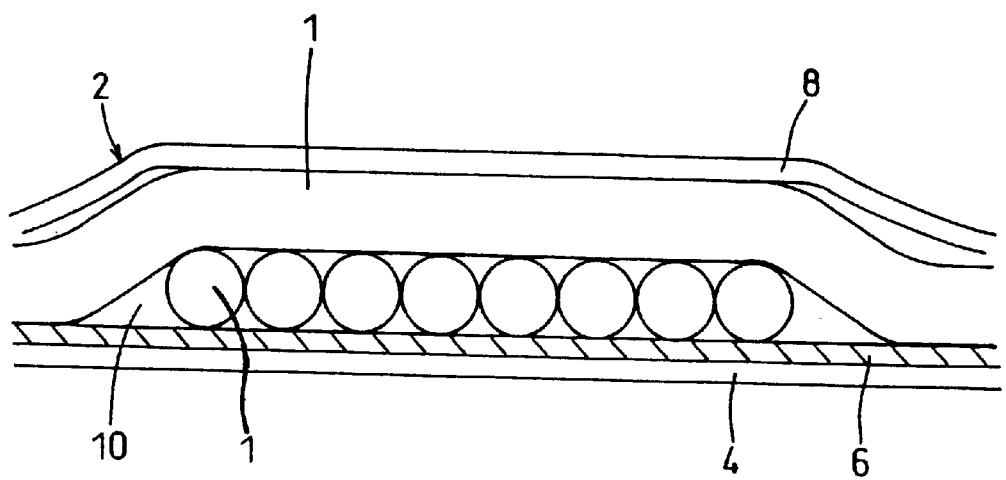

In this structure for holding optical fibers, as shown in FIG. 2B, there is a part where the end of each optical fiber 1 on the introduction side and the end of the optical fiber 1 on the leading side cross each other in the thin member 2. However, at the intersection, the optical fiber 1 crosses over the leading portions of all optical fibers in the thin member 2 as shown in FIG. 2B. Since the optical fibers 2 are not stacked in three or more layers, the structure for holding the optical fibers 1 is not so voluminous in the thickness direction.

In the case of the embodiment, the thin member 2 mentioned above is constructed by including a base material layer 4 made of a resin material such as PET (polyethylene terephthalate), an adhesive material layer 6 obtained by applying a silicon adhesive or the like on the base material layer 4, and a laminate material layer 8 arranged over the adhesive material layer 6 so as to sandwich the optical fibers 1.

To obtain the structure for holding the optical fibers as shown in FIGS. 1, 2A and 2B, a plurality of optical fibers 1 are prepared. In this case, the lengths of each optical fibers 1 are set according to various transfer time differences. Consequently, transmission time can be set as required. In setting of the length, according to a system used, high precision may be required or an allowance to a certain degree may be given.

The lengths of each optical fibers 1 may be set to be the same. Since the transfer time of each optical fibers 1 becomes the same, it is unnecessary to consider variations in delay in the optical fibers 1 in the thin member 2. Consequently, it makes a work of connecting the optical fibers 1 to another device convenient.

As described above, the plurality of optical fibers 1 are routed on the adhesive material layer 6 on the thin member 2 while being deviated from each other in a plane so as to reduce the overlapped areas and, after that, the adhesive material layer 6 is covered with the laminate material layer 8. Consequently, the laminate material layer 8 and the adhesive material layer 6 are bonded in a state where the optical fibers 1 are sandwiched by them, and the optical fibers 1 are integrally sealed and held by the thin member 2.

At this time, as shown in FIG. 2B, in the portion where the optical fibers 1 are overlapped and cross each other, an air layer 10 is positively interposed between the adhesive material layer 6 and the laminate material layer 8. The air layer 10 functions as a buffer member to thereby prevent an excessive bending force from being applied to the optical fibers 1. Since the excessive bending force on the optical fibers 1 causes an increase in loss of optical transfer, by providing the air layer 10, light transmission efficiency can be increased.

By constructing the structure for holding optical fibers as described above, the plurality of optical fibers 1 can be integrally handled without coming apart or being entangled as a whole and easily disposed in a device. The holding structure has a sheet shape as a whole and, moreover, its thickness is equal to only the total of the outside diameter of the optical fiber 1 and the thickness of the thin member 2 except for the overlapped portions of the optical fibers 1. Therefore, the thin structure for holding the optical fibers is achieved. Even in the case where the structure for holding optical fibers is disposed in the casing of a device, a small space for housing is sufficient, so that the small size can be realized. Moreover, each optical fibers 1 is protected by the thin member 2, so that an influence such as a damage on the optical fibers 1 can be lessened.

In the structure for holding optical fibers shown in FIGS. 1, 2A, and 2B, depending on the materials of the base material layer 4 and the laminate material layer 8, there is such a case that affinity for the adhesive material layer 6 is poor and it is difficult to keep high adhesiveness. In this case, it is sufficient to form a coating layer having a high affinity for the adhesive material layer 6 on the surface of the base material layer 4 and the surface of the laminate material layer 8. The coating layer is therefore interposed between the base material layer 4 and the adhesive material layer 6 and between the laminate material layer 8 and the adhesive material layer 6 so that high adhesiveness can be obtained.

Figure 4:
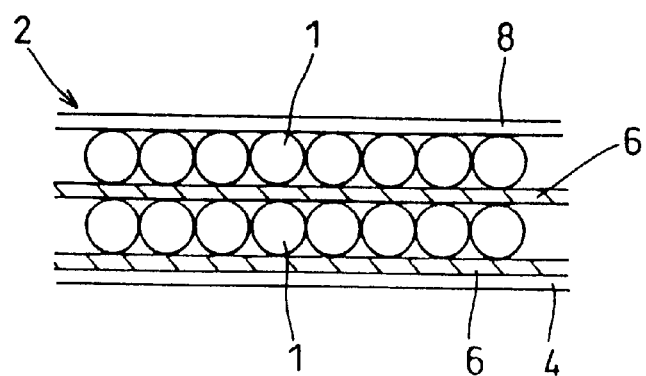
FIG. 4 is a cross section of the structure for holding optical fibers of FIGS. 3A and 3B.

In the embodiment shown in FIGS. 1, 2A, and 2B, the number of optical fibers 1 routed is limited. In order to further increase the number of fibers routed, for example, as shown in FIGS. 3A, 3B, and 4, a multi-layer structure may be employed.

First, as shown in FIG. 3A, the plurality of optical fibers 1 are routed on the adhesive material layer 6 formed on the base material layer 4 while being deviated from each other in a plane so as to reduce the areas where the optical fibers 1 are overlapped with each other. On the optical fibers 1, the adhesive material layer 6 is formed and further, as shown in FIG. 3B, the plurality of optical fibers 1 are routed on the adhesive material layer 6 while being deviated from each other in a plane so as to reduce the areas where the optical fibers 1 are overlapped with each other. The optical fibers 1 are covered with the laminate material layer 8, and bonding is performed in a state where the optical fibers 1 in the upper and lower layers are sandwiched by the laminate material layer 8 and the adhesive material layers 6 and 6. Consequently, the optical fibers 1 are integrally sealed and held. Since the optical fibers 1 of the different layers which are laminated are disposed in different planes, it is not so necessary to deviate the optical fibers 1 in a plane from those in another plane so as to reduce the area where they are overlapped with each other. Each of FIGS. 3A and 3B shows a state where the optical fibers 1 in each layer are routed on the adhesive layer 6 and 6.

Figure 5:
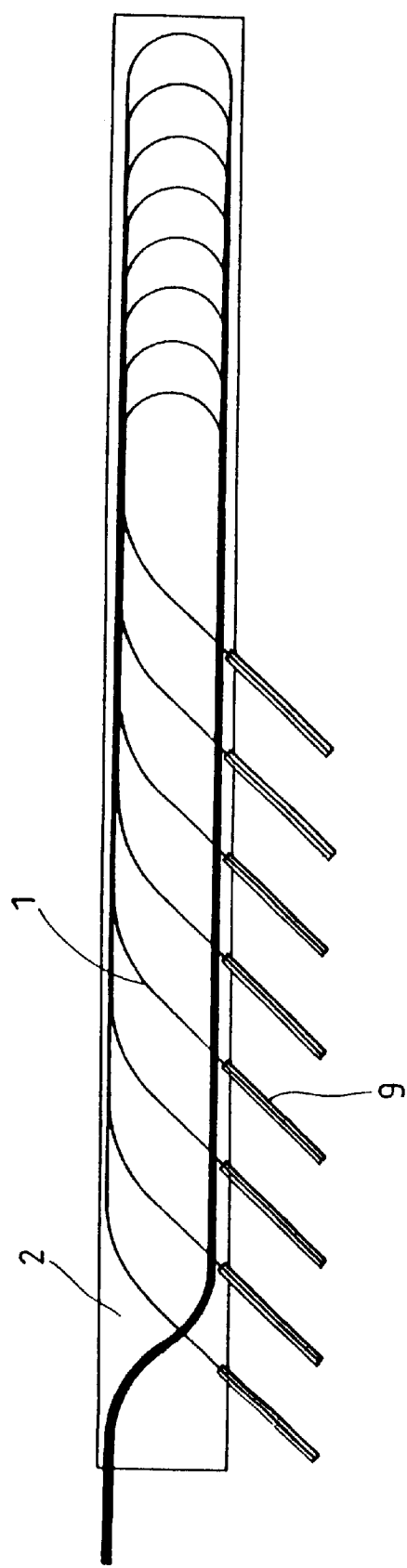
FIG. 5 is a plan view showing a state where an end part of an optical fiber, led from a thin member to the outside is covered with a tube in the structure for holding optical fibers of the invention.

Further, in order to prevent breakage in the led portion of each optical fiber 1, the configuration as shown in FIG. 5 may be employed. Specifically, the end of the optical fiber 1 led from the thin member 2 to the outside is covered with a thin tube 9 made of vinyl or the like. In such a state, one end of the tube 9 is sandwiched by the thin member 1. With such a configuration, the end portion of the optical fiber 1 led from the thin member 2 is reinforced, so that breakage can be prevented and the reliability can be enhanced.

By selecting the material of the laminate material layer 8 as that of the thin member 2 for example, the thin member 2 can be produced so as to be hard or flexible in accordance with necessity of mounting into a device. Further, by making the laminate material layer 8 of a fire-resistant material, the reliability of a component device can be further improved.

In the foregoing embodiment, the invention has been described by using, as an example, the structure of routing the plurality of optical fibers 1 in a plane and sealing them with the thin member 2. Obviously, it is also possible to route a single optical fiber 1 in a plane and seal it with the thin member 2.

Figure 6:
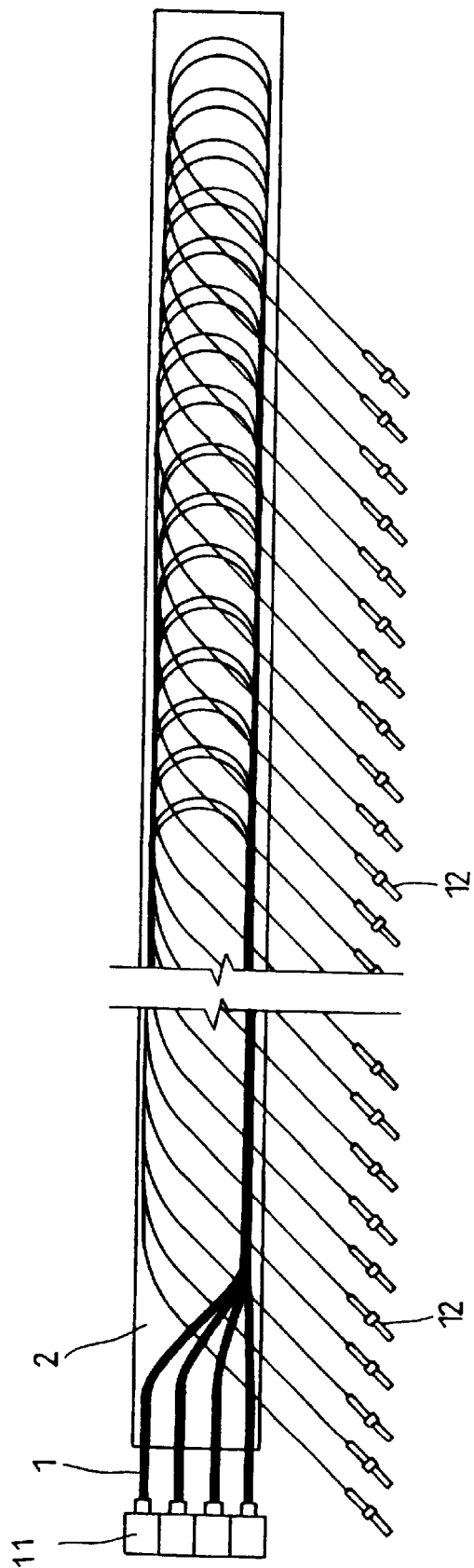
FIG. 6 is a plan view showing a case where a number of optical fibers are stacked and a connector is connected to an end of an optical fiber in the structure for holding optical fibers.
Figure 7:
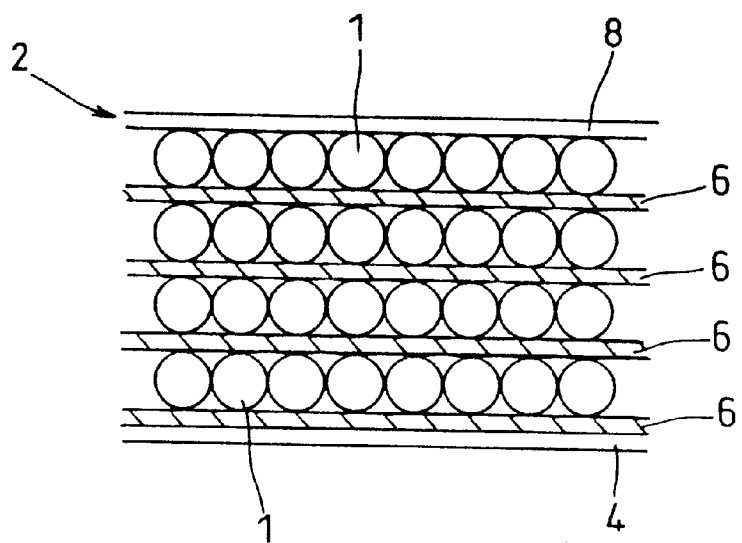
FIG. 7 is a cross section of the structure for holding optical fibers of FIG. 6.

As shown in FIGS. 6 and 7, a configuration in which connectors 11 and 12 are attached to ends of the optical fibers 1 led from the thin member 2 may also be employed.

Specifically, the holding structure of this example is a multi-layer structure in which the optical fibers 1 are stacked in four layers in the thickness direction of the thin member 2. The multi-port-connector 11 such as MT (Mechanical Transferrable connector) or MPO Multifiber push-on connector) is connected to one end of each of the optical fibers 1 and the single connector 12 such as MU (Miniaure-Unite coupling optical connector) is connected to the other end. With the configuration, connection to other devices is facilitated. In place of the single connector 12, a single ferrule can be connected.

Industrial Applicability

According to the invention, a plurality of optical fibers can be handled integrally without coming part or entangling as a whole and easily housed in a device. Since the whole is formed in a sheet state and thin, a small housing space is sufficient, and a small size can be achieved. Moreover, since each optical fiber is protected by the thin member, an influence such as a damage can be lessened.

When the lengths of optical fibers are set to required lengths, a transfer time difference can be freely set among the optical fibers in the thin member.

When the lengths of the optical fibers are set to the same length, the transfer time of the optical fibers becomes the same. Consequently, it becomes unnecessary to consider a delay difference in the optical fibers in the thin member.

When the holding part of the optical fiber is set redundantly to adjust the length of the optical fiber, redundancy is assured in a routing path of the optical fiber, so that the length of the optical fiber can be adjusted to a required length. That is, the transfer time difference can be freely set and adjusted.

By covering the end of an optical fiber led from the thin member to the outside with a tube, breakage of the optical fiber led from the thin member can be prevented and reliability can be increased.

When the thin member is made of a material whose flexibility can be controlled, by controlling the flexibility in accordance with the degree of mounting to a device, the mounting to the device can be facilitated.

By preliminarily providing each optical fiber with a connector, connection to another device becomes easy.

What is claimed is:

1. A structure for holding an optical fiber, comprising:

a thin member; and a plurality of optical fibers sealed with a said thin member, said plurality of optical fibers being set to required lengths, each of said plurality of optical fibers including an introduction portion and a leading portion, said introduction portion of at least one of said Plurality of optical fibers crossing over said leading portions of said plurality of optical fibers, said leading portions of said plurality of optical fibers being in a same plane.

2. The structure for holding an optical fiber according to claim 1, wherein said thin member including a first layer and a second layer, said plurality of optical fibers being sandwiched by said first layer and said second layer.

3. The structure for holding an optical fiber according to claim 1, further comprising an air layer said air layer being in a portion where said introduction portion of said at least one of said plurality of optical fibers crossing over said leading portions of said plurality of optical fibers in said thin member.

4. The structure for holding an optical fiber according to claim 1, wherein a connector is attached to an end part of an optical fiber led from said thin member.

5. The structure for holding an optical fiber according to claim 1, wherein said plurality of optical fibers are set to a same length.

6. The structure for holding an optical fiber according to claim 1, wherein an optical fiber in said thin member is provided with a redundancy area for adjusting the length of said optical fiber.

7. The structure for holding an optical fiber according to claim 1, wherein an end part of said optical fiber led from said thin member is covered with a protection tube and the protection tube is held by said thin member.

8. The structure for holding an optical fiber according to claim 1, wherein said thin member is made of a material whose main component is a resin.

9. The structure for holding an optical fiber according to claim 1, wherein said thin member is made of a material whose flexibility can be arbitrarily adjusted.

* * * * *